United States Patent [19]

Brachet

[11] 4,236,409

[45] Dec. 2, 1980

[54] DEVICE FOR INDICATING OPTIMUM SAIL POSITION

[76] Inventor: Roland Brachet, Domaine d'Arnaga, Callian, France, 83810

[21] Appl. No.: 952,979

[22] Filed: Oct. 20, 1978

[30] Foreign Application Priority Data

Dec. 7, 1977 [FR] France .............................. 77 36802

[51] Int. Cl.$^3$ ............................................. G01C 21/00
[52] U.S. Cl. .................................. 73/178 R; 33/1 C; 114/102; 114/114; 116/300; 116/DIG. 43
[58] Field of Search ................. 116/264, 265, 266, 26; 73/188, 186; 33/1 MP, 1 N, 1 PT; 114/102, 114 C

[56] References Cited

U.S. PATENT DOCUMENTS

| | | | |
|---|---|---|---|
| 3,478,585 | 11/1969 | Scannel | 73/188 |
| 3,665,759 | 3/1972 | Daley | 73/188 |
| 4,022,150 | 5/1977 | Greene | 73/188 X |
| 4,027,533 | 6/1977 | Pretto | 73/188 |

OTHER PUBLICATIONS

Publ. "Sailing Theory and Practice" CA Marchaj. C 1964 pp. 69-76, 121-126.

*Primary Examiner*—Daniel M. Yasich
*Attorney, Agent, or Firm*—Sandler & Greenblum

[57] ABSTRACT

An indicator for indicating the optimum angular position of a sail which is adapted to be rotated in various positions relative to a wind, and wherein the position of the sail may be represented by a polar curve comprising a laminar zone, a drop-off zone, a transition zone and a checking zone. The indicator comprises display means for displaying the optimum angular position of the sail relative to the wind as well as evaluation means for determining the position of the sail which corresponds to value between the end of the laminar zone and the beginning of the checking zone as a function of the direction of the wind. Means for indicating the direction of the wind to the evaluation means and driving means for driving the display means to display the optimum sail position are also included.

14 Claims, 10 Drawing Figures

DEVICE FOR INDICATING OPTIMUM SAIL POSITION

BACKGROUND OF THE INVENTION

1. Field of the Invention

The invention relates to an indicator for indicating the optimum angular position of a sail on a sailing vessel.

2. Description of the Prior Art

A device is known which may be used on sailing vessels for indicating the sail orientation which should provide the strongest thrust in the sailing direction of the vessel. The device operates on a principle based on an observation which will now be described.

If (A) is called the wind angle and (B) is called the sail angle, defined with respect to the axis of the vessel from stern to bow and being assigned a sign in accordance with the usual convention, the incidence angle of the wind on the sail is (A) − (B). The reaction force received by the sail, perpendicular to itself, is proportional to the sine of the angle (A) − (B). Thus, for a wind having a given force, the component of the reaction force in the sailing direction will be proportional to the product $$\sin\{(A) - (B)\} \times \sin(B)$$

A simple calculation will therefore show that this product reaches a maximum when $(B) = (A)/2$.

This prior art device comprises a vane type member which drives a pinion which in turn drives a second pinion having a diameter twice that of the first pinion, either directly or by means of an auxiliary pinion. Thus, the shaft of the second pinion turns at an angle equal to half that of the vane and in the same direction. A direction index or indicator as well as the entire device is mounted on the vessel and set such that for a following wind coaxial with the direction of displacement of the vessel $\{(A) = 180°\}$, the indicator indicates an angular position of the sail perpendicular to the direction of displacement $\{(B) = 90°\}$.

Using such an arrangement the vessel pilot could quickly adjust his sail so as to obtain the best possible thrust.

Unfortunately, such a device is based upon an overly simplified theory which is only valid for small or large wind angles but not for any intermediate values.

SUMMARY OF THE INVENTION

It is, therefore, an object of the invention to provide an indicator device for accurately providing information as to maximum thrust for intermediate angles as well as angles at both extremes.

It is a further object of the invention to provide an indicator device which may be either mechanically or computer controlled.

These and other objects are fulfilled by means of the indicator device of the invention. The indicator or indicating the optimum angular position of a sail which sail is adapted to be rotated in various positions relative to a wind such that the position of the sail may be represented by a polar curve comprising a laminar zone, a drop-off zone, a transition zone, and a checking zone comprises: display means for displaying the optimum angular position of the sail relative to the wind; evaluation means for determining the position of the sail which corresponds to a value between the end of the laminar zone and the beginning of the checking zone as a function of the direction of the wind; indication means for indicating the direction of the wind to said evaluation means; and driving means for driving the display means to display the optimum position referred to above.

In one embodiment of the invention the means for indicating the direction of the wind comprises a vane. The evaluation means may comprise a cam whose shape is a function of the polar curve as well as a cam follower adapted to move along the cam and a first rod adapted to move the follower along the cam. Additionally, second and third rods pivotably connected to one another between the cam follower and the driving means are also provided. The second rod is adapted to drive the driving means which in turn drives the display means to display the optimum position of the sail.

The first rod of the indicator device may be connected to a sleeve; the sleeve being arranged such that the central axis of rotation of the sleeve is at a point at the center of rotation with respect to the movement of the cam follower and arranged above the driving means and coaxial therewith. The driving means comprises a ring, whereby movement of the vane is communicated to the sleeve thus causing the cam follower to move along the cam which in turn causes the ring to rotate as a function of the shape of said cam. The driving means may further comprise a first pinion while the display means may be mounted on a second pinion coupled to the first pinion, and having a diameter twice that of the first pinion.

In another embodiment of the invention, the device comprises a vane as the means for indicating the direction of the wind and further comprises: a computer means which is coupled to the vane by means of a transducer; as well as means for providing the computer with information as to the equation for defining the optimum angular sail position with respect to varying wind angles as a function of the polar curve of the sail. The display means is adapted to receive the optimum angular sail position from the computer and to visibly display this position. The optimum angular position may be displayed either digitally or angularly.

In yet another embodiment of the invention the indicator device is used in combination with a vessel comprising a sail and a boom, while the indicator further comprises a first angular sensor connected to the boom to sense the angular position of the boom, and a second angular sensor connected to the display means. Each of the first and second angular sensors is connected to a comparison means for comparing the angles coming from each of the sensors. The comparison means is in turn connected to a final display means such that the angular difference between position of the boom and the optimum angular position of the sail is digitally displayed.

In yet another embodiment of the invention, the angular position of the boom may be controlled by an electromechanical means connected to the comparison means.

DESCRIPTION OF PREFERRED EMBODIMENTS

According to the invention, the indicator is to be used with the sail or sails of a sailing vessel. Each of the sails comprises a boom and its wind characteristics may be defined by a polar curve comprising a laminar zone, a drop-off zone, a transition zone, and a checking zone. The indicator comprises indication means for indicating the wind direction, driving means for displaying the optimum angular position of the sails in a ratio of 1:2, with respect to said driving means, for the laminar and checking zones. The driving means are set or adjusted with respect to an angular reference position. Evaluation means are provided for controlling the angular variation of the display means in accordance with the polar curve of the sail in the zones between the end of the laminar zone and the beginning of the checking zone.

In one embodiment of the invention, the device comprises a vane which constitutes the means for indicating the direction of the wind. The vane is connected to rotate with a rod which in turn carries a cam follower guided by a cam having a shape which is a function of the polar curve of the sail. The cam follower is connected by means of two rods to a member at the center of rotation, a ring member for example, such that the rod adjacent the member is coupled to rotate angularly in unison with a first pinion connected to a second pinion by means of a chain. The second pinion has a radius which is twice that of the first. The second pinion is coupled to the display means which actually displays the optimum angular position of the sail relative to the wind.

In yet another embodiment the indicator comprises a vane connected to a transducer which supplies a computer with information as to the angular position of the wind relative to the axis of displacement of the vessel. Additionally, an independent device adapted to provide the computer with the profile law or equation to be followed as a function of the polar curve of the sail as well as a display device receiving the information from the computer is also provided. The display device may be either digital or angular. In a further embodiment of the invention the indicator comprises an angular sensor connected to the boom of the vessel, and an angular sensor connected to the angular display device. A comparison means is connected to each of these sensors and to a final display device for displaying the angular difference of the position of the boom with respect to the optimum thrust angle displayed at the angular display device.

In those vessels which comprise a mechanical control means for modifying the angular position of the boom of the sail, the boom may be controlled by the indicator device so as to result in an automatic pilot assembly.

As yet another feature, an electromechanical assembly may be provided for controlling the boom and is itself controlled by the comparison stage.

The invention will now be described with reference to the accompanying drawings.

Figure 1:
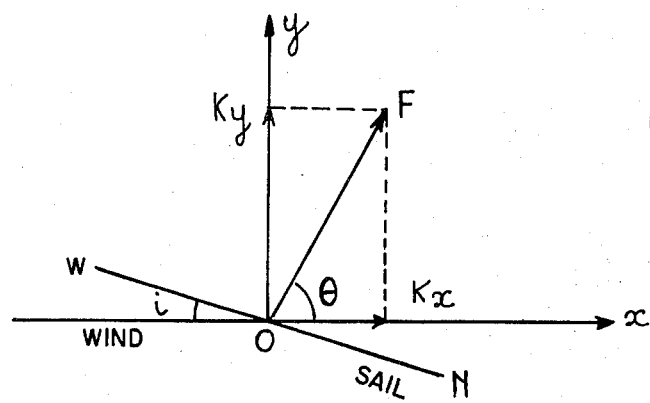
FIGS. 1 through 5 are mathematical diagrams explaining the mathematical principles on which the invention is based.

FIG. 1 is a force diagram illustrating a sail WN, which is exposed to the wind at an angle of incidence i. If two axes are selected starting at the center of thrust O, Ox may be taken to represent the wind direction and Oy will be perpendicular to Ox. As a result of the wind, the sail is subjected to a force F which is split up into Kx along the Ox axis and Ky along the Oy axis. The force F forms an angle $\theta$ with Ox. By varying the angle of incidence i, Kx and Ky may be measured at each instant. $\theta$ may be calculated from these values as it is equal to arc tan Ky/Kx. The different values of $\theta$ obtained in this way are plotted in FIG. 2 which is taken to represent the "polar curve" of the sail. The values of i are parametric values of the point under consideration since $\theta$ is close to but just below the complement of i.

Figure 2:
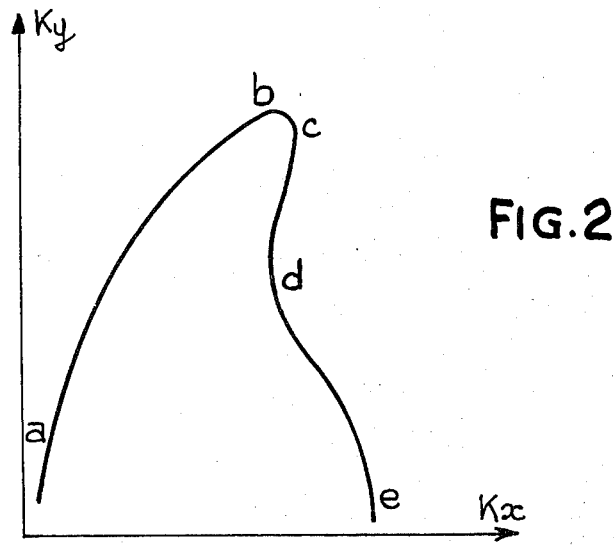

By starting from a zero angle of incidence and progressively increasing this angle the polar curve of FIG. 2 is plotted so as to contain the following arcs:

arc ab having a continous curvature corresponds to what is denominated the "laminar zone";

arc bc which represents a sudden change in curvature corresponds to the "drop-off zone";

arc cd is denominated as the "transition zone" just preceeding the final operating condition; and arc de called the "checking zone" represents the condition wherein the sail progressively approaches a position perpendicular to the wind.

Throughout the foregoing discussion the forces applied were reduced to a unit of sail surface and a unit of wind speed.

Figure 3:
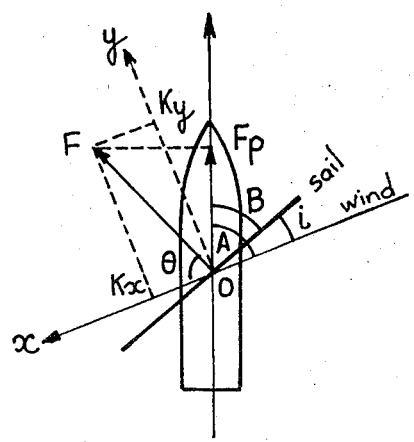

FIG. 3 diagrammatically illustrates the interaction which occurs between sail orientation and wind and sailing direction. As shown in this Figure, the sail is adjusted to an angle (B) relative to the sailing direction and is acted upon by the wind at an angle (A) with respect to the sailing direction.

The force OF: $\vec{F}$ received by the sail forms an angle $\theta$ relative to the wind direction. The polar curve of the sail sets forth the components Kx, Ky, the angle $\theta$ and the length of OF.

The active force, i.e., the force providing the propulsion for the vessel, is the projection Fp of the force F along the axis of the vessel. The keel of the vessel opposes the force component perpendicular to the axis of the vessel.

As used herein the word "wind" is understood to be the "apparent wind", i.e., the wind effectively received by the moving vessel.

Fp has a value:

$$Fp = F \cos \{\pi - (A + \theta)\}$$
$$= F \cos | A + \theta |$$

In view of the above it will now be possible to find the angle of the sail (Bm) which will provide the largest force Fp for the vessel which results in the greatest speed.

Starting with the polar curve, given that i = (A) − (B); for a given value of (A) there will exist successive graduated values of (B). For each value (B), the value of the corresponding Fp may be established by means of a plot on the polar curve together with a complementary calculation. Using all of the points thus obtained, a graph may be plotted, which represents Fp as a function of (B). Using this graph it will be possible to determine the (Bm) which will provide the maximum propulsive force for a given (A).

Thus, an equation may be developed wherein Bm = g{(A)} which will provide the sail angle (Bm) which will provide the greatest vessel speed for each wind angle (A). With this equation it will be possible to derive the relationship:

$$(Bm)/(A) = F\{(A)\}$$

which relates the ratio of the optimum angle of the boom to the angle of the wind as a function of the angle of the wind.

Figure 4:
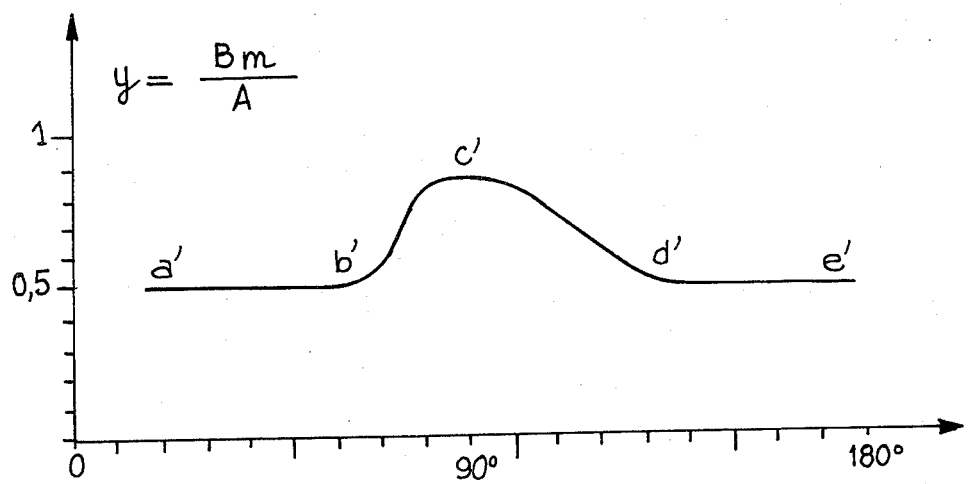

A graph of this last relationship is illustrated in FIG. 4. It should be noted that the zones a'b', and d'e' correspond to the zones ab and de of the polar curve and are horizontal straight lines having an ordinate value ½ so that in these zones the devices used by the prior art would give a true indication.

However, it is clear that in the intermediate zone b'c'd', the ratio (Bm)/(A) is greater than in the other zones and passes through a maximum at c'. The location and shape of the zone b'c'd' is a function of the sail being used as will now be explained.

Until this point it has been assumed that there is no interaction between the lateral effect of the wind (blocked by the keel) and the propulsive longitudinal effect. Such an assumption is only strictly correct for efficient keels and for lateral effects of reasonable amplitude. If either of these conditions is not met (Bm) would have to be corrected. All other factors being equal, this correction would mean bringing the sail closer to the wind, i.e., slightly increasing the ordinate of the curve in FIG. 4.

The device of the invention may be used with all types of sails fitted with booms whose direction may be controlled since the device functions based on the polar curve of the sail.

There are generally two main types of sails:

(i) sails having a large "laminar zone" for which the curve ab has a low mean slope but which reaches a high value with the drop-off occuring at angles i on the order of 30°; and (ii) "great extension sails" (a term describing the general geometrical configuration) for which the curve ab has on the average a high slope but which has a drop-off occuring at a smaller angle which may be reduced to 10°. Such sails are designed to provide a better beating to the wind in accordance with a theory, which is incorrect, that the maximum propulsive force of the polar curve (zone from point b) results when the angle i is as small as possible.

Thus, using the general relationship between (Bm) and (A) holds true in all cases as shown in FIG. 4:

for sailing vessels having a large laminar zone, the zone b'c'd' extends from about 70° to 140° and (Bm) may reach a value of 0.75 (A) in the region of c';

for sailing vessels having a high beating to windward, the zone b'c'd' extends from 20° to 110° and the value of (Bm) may reach 0.85 A in the region of c'.

Figure 5:
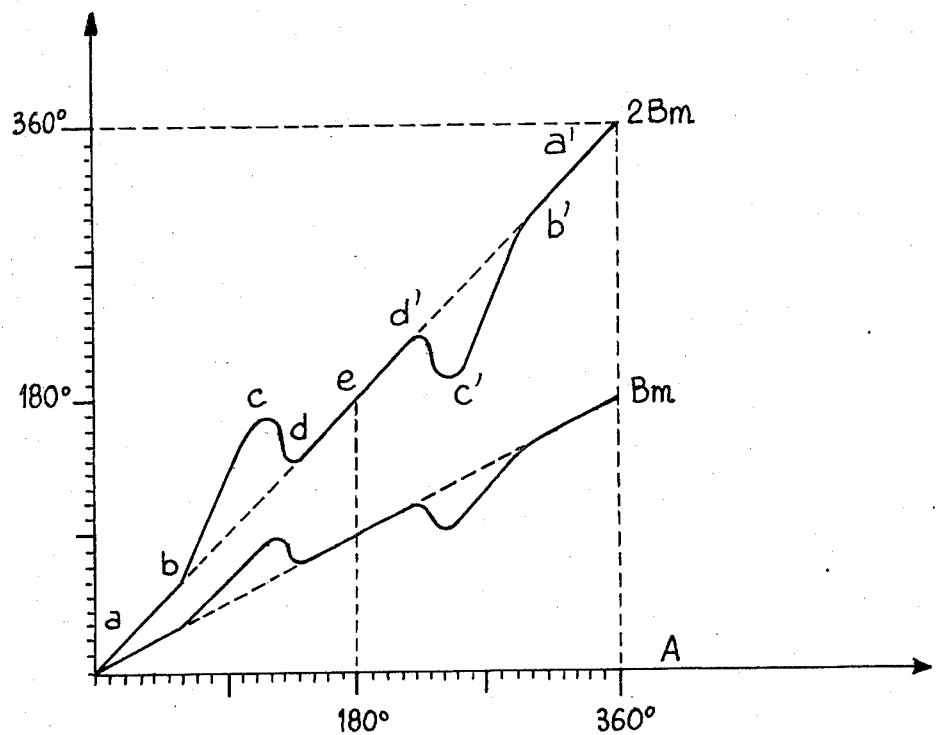

Another way of representing the phenomena under discussion is illustrated in FIG. 5 wherein:

The angle (A) varies from 0° to 360° i.e., a complete revolution of the wind relative to the vessel axis; and the angle (Bm)/(A) is shown, as well as the angle (Bm) for reasons which will be hereinafter described.

For a boom angle of about 180° the results of the relative values of the boom angle and the wind angle are symmetrical with respect to the axis of vessel, the curve (Bm) =f{(A)} is symmetrical with respect to the point (A) = 180° and (Bm) = 90° and the curve 2(Bm)=h{(A)} is symmetrical with respect to the point (A) = 180° and 2(Bm) = 180°.

Along the curve illustrating 2(Bm), the transition zones indicated in FIG. 4 have been illustrated in prime for the complementary symmetrical zone. In this figure, ab, ded' and b'a' are the zones of the prior art where (Bm) = (A)/2 and 2(Bm)=(A). Zones bcd and d'c'b' are zones where the sail angle (Bm) providing the maximum thrust in the direction followed by the sailing vessel must be corrected.

FIG. 4 has been considered in terms of a relative ratio of two angles. FIG. 5 makes it possible to consider the phase angle. (Bm) is formed as if the angle 2(Bm) which, on the average, equals (A) for a complete rotation of 360° showed a phase displacement relative to (A) in the zones bcd and d'c'b'. This form of representation will better illustrate certain aspects of the invention to be discussed.

Figure 6:
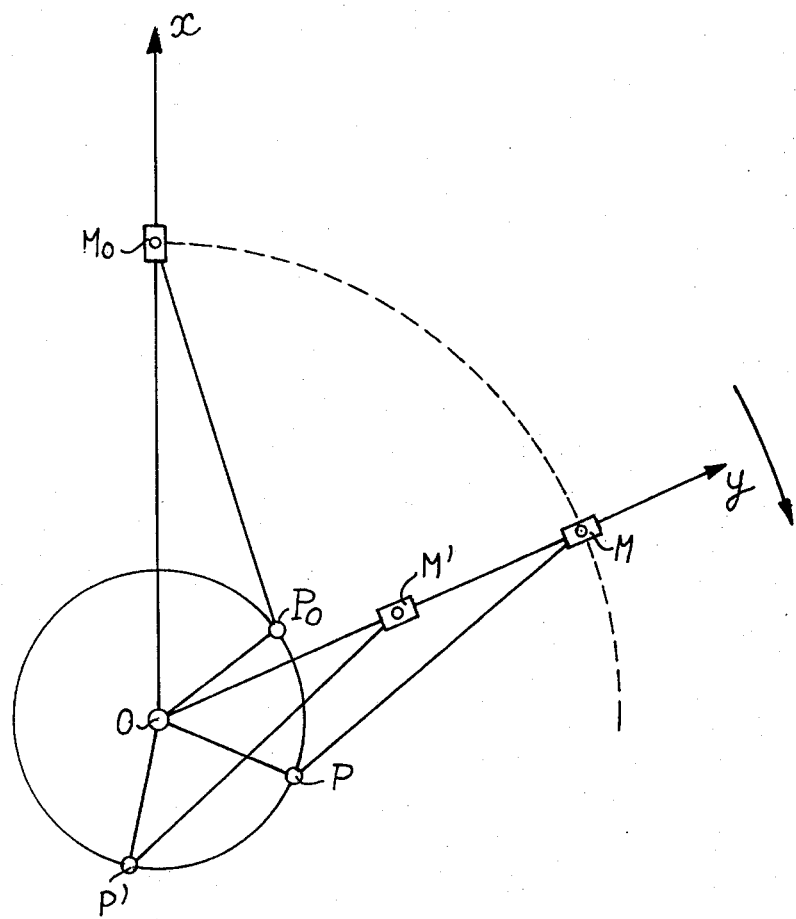
FIG. 6 diagramatically illustrates the principle governing the mechanical indicator of the invention.

FIG. 6 is a schematic representation of the movement of axis Oy as it rotates about point O. A slide M is connected by a rod MP to a pivot P which is itself connected to the center O by means of a rod PO. The rods MP and PO have a constant length. Initially, ∠yOx = 0°. while M is Mo and P is Po. The angle MoOPo is a parameter of the initial adjustment of the device. The point M is moved by sliding it along the axis Oy which is in rotation.

It may be clearly seen that as long as the point M remains at a constant distance from O, i.e., without sliding along Oy, the triangle MOP will remain unchanged and the angle between MO and OP will remain constant. However, if, for example, for the axis Oy as illustrated, M is guided so as to slide to the position M', the rod OP will assume the position OP' while the relationship OP = OP' and MP = M'P' will be preserved. As a result, a variable phase ratio exists between the axis OM and the direction OP which is a function of the distance MM' depending on the location of the slide M with respect to the circle having the radius Mo.

Figure 7:
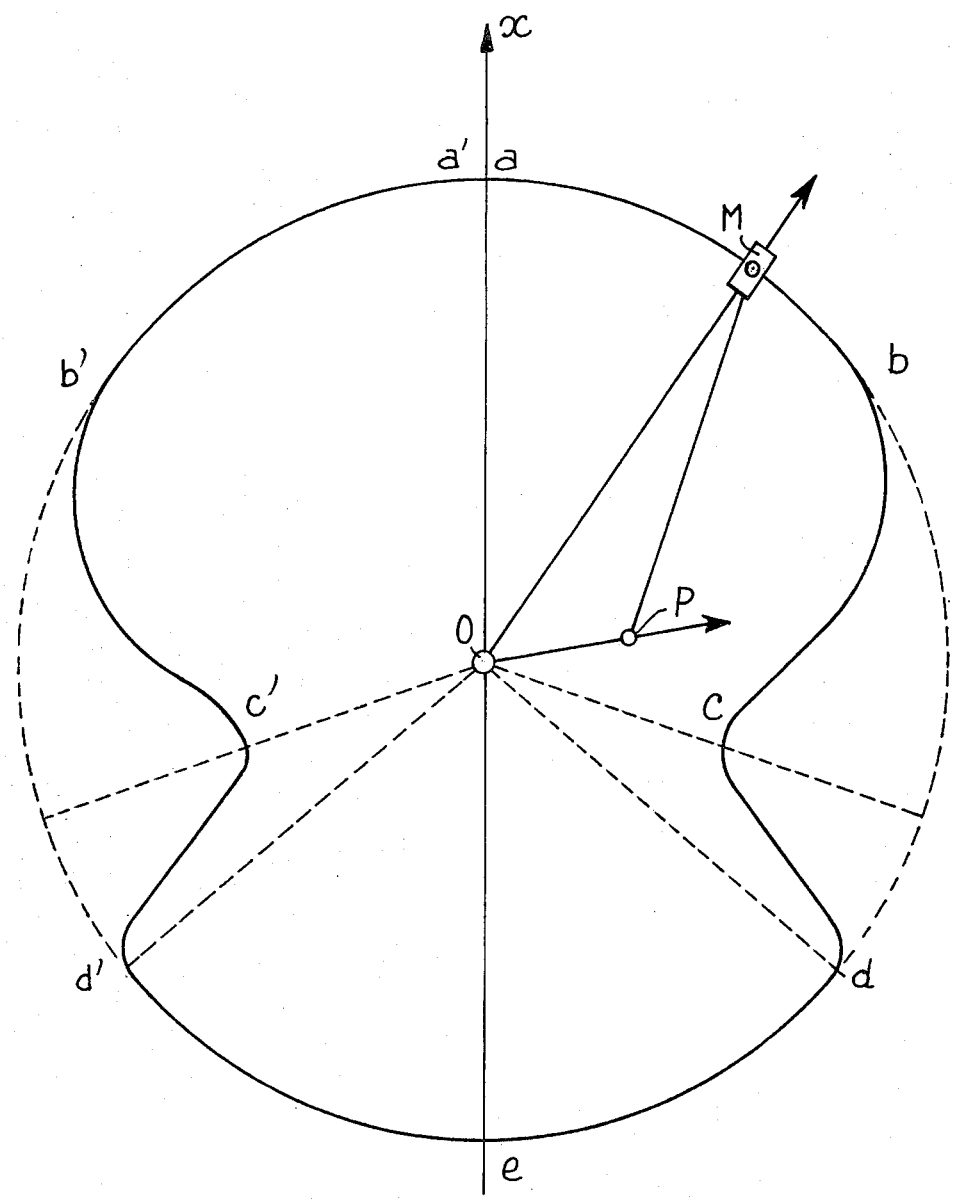
FIG. 7 illustrates a cam used in the mechanical embodiment of the invention.
Figure 8:
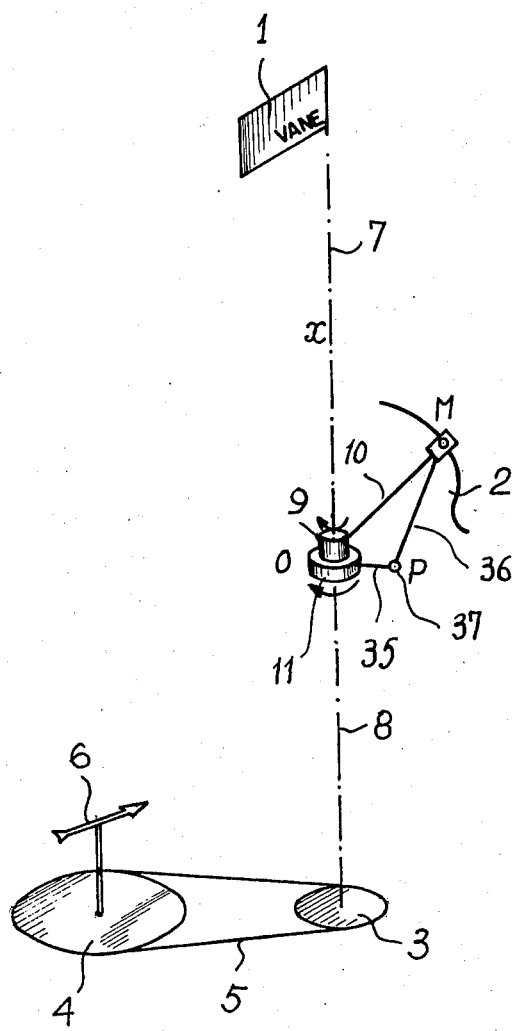
FIG. 8 schematically represents the general arrangement of the indicator device of the invention.

According to one embodiment of the invention, such an arrangement may be used advantageously to form an evaluation means such as the one shown in FIG. 8. In order to better understand what is shown is FIG. 8, reference is first made to FIG. 7 in which a cam arrangement is shown which permits the reproduction of the relationship represented in FIG. 5 between 2(Bm) and (A) between the angle formed by OM and Ox and the angle formed by OP and Ox with a slight initial angular displacement of the angle formed between OP and Ox. The relationship between the zones of interest is located between between the two FIGS. 5 and 7 which show the laminar zones ab and a'b', drop-off zones bc and b'c', transition zones cd and c'd' and finally the checking zones de and d'e'.

FIG. 8 illustrates an indicator device making use of the cam such as that of FIG. 7.

As shown in FIG. 8, a vane 1 is positioned where it may sense the wind direction and is rotatably coupled by means of a connection 7 to a sleeve 9 which directly causes first rod 10 to rotate by virtue of the fact that sleeve 9 is connected to first rod 10. A slide or cam follower M is mounted at the end of the first rod 10 such that as the sleeve rotates the cam which may be appropriately positioned on a vessel follower moves along the cam. As the follower moves down the cam with reference to FIG. 8, the follower is brought closer to axis x thereby causing an increased angular rotation of ring 11 relative to sleeve 9.

A ring 11, is connected to the follower M by means of second and third rods 35 and 36 hinged along a pivot shaft 37, rotates freely with respect to sleeve 9 as shown by the directional arrows of FIG. 8 and is preferably mounted coaxial therewith.

Second rod 35 is coupled so as to rotate together with connection means 8 through ring member 11 to a first pinion 3, which is itself coupled by a chain 5 to a second pinion 4. The radii of the pinions 3 and 4 are in a ratio of 1:2 while the cam is indicated by reference numeral 2.

After a suitable initial angular alignment, a display means 6 which may be visibly positioned on a vessel, connected to rotate together with second pinion 4 indicates the direction of the sail which will provide the maximum power to the sailing vessel in the sailing direction which the vessel is following.

The initial alignment is made once and for all when the device is installed and involves ensuring that for a perfect headwind $\{(A)=0°\}$, the angle (Bm) is also equal to zero, or that for a perfect following wind $\{(A)=180°\}$, the angle (Bm) is 90°.

Figure 9:
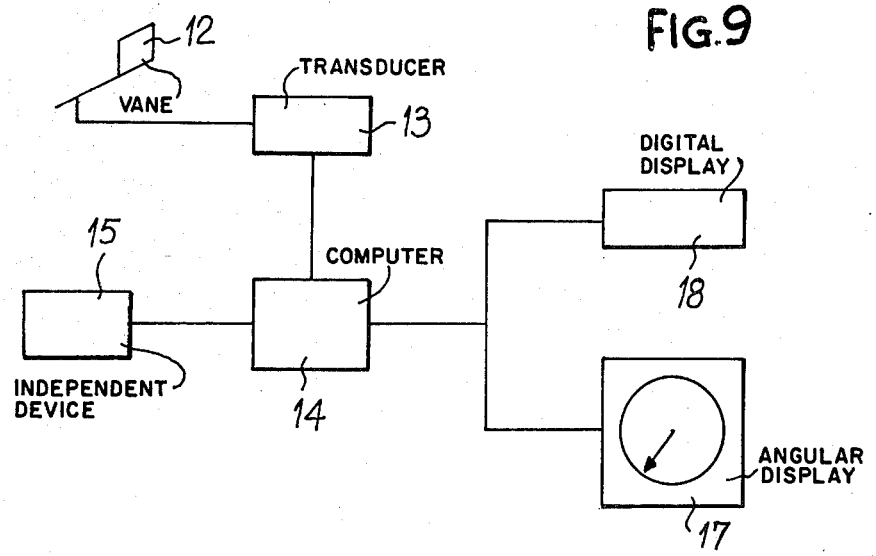
FIG. 9 schematically illustrates a computerized embodiment of the invention.

FIG. 9 illustrates an electronic embodiment of the invention.

In this figure, the device comprises a vane 12 which may be positioned on the vessel to sense relative wind position which, with the assistance of a transducer 13 of the type disclosed in U.S. Pat. No. 4,022,150, informs a computer 14 of the angular position of the wind relative to the axis of displacement of the vessel. An independent device 15 informs the computer 14 as to the equation defining the optimum angular sail position with respect to varying wind angles as a function of the polar curve of the sail and thus, the computer establishes the optimum angle of the sail and displays it on an angular display 17 and simultaneously on a digital display 18.

The computer 14 is programmed to receive, numerically, a system of analog equations permitting the general form of the polar curve to be represented starting with the characteristic elements of the polar curve and, starting with this formulation to investigate what is the functioning point of the polar curve which will provide the maximum thrust and to deduce the corresponding angle of the sail.

The same computer may also be programmed with a system of analog equations describing the angle (Bm) as a function of the angl (A) for the sail being used, thus simulating the cam curvature represented pictorially in FIG. 7.

Figure 10:
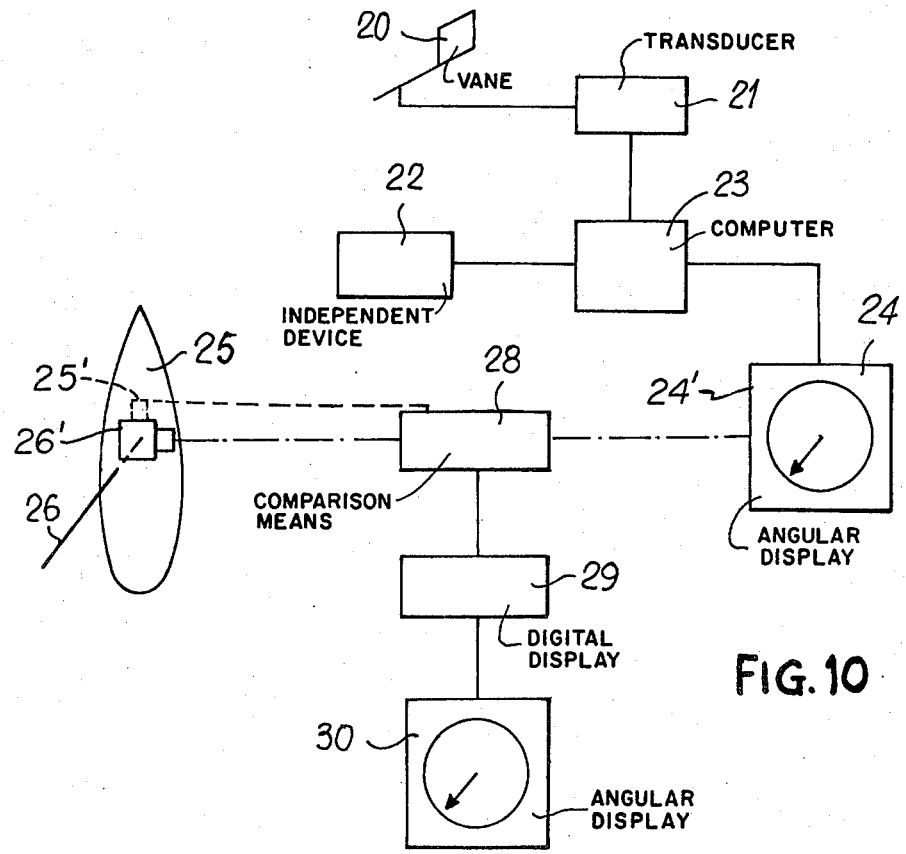
FIG. 10 illustrates an alternative computerized embodiment.

FIG. 10 illustrates a modified embodiment of the invention which may be positioned on the vessel so as to indicate relative wind direction and which comprises a vane 20 which, by means of a transducer 21 of the type disclosed in U.S. Pat. No. 4,022,150, informs a computer 23 of the microprocessor-L.S.I. type of the angular position of the wind with respect to the axis along which the vessel 25 is moving. An independent device 22 informs the computer 23 of the equation or profile law to be followed as a function of the polar curve of the sail such that the computer establishes the optimum angle of the sail and displays it on an angular display 24.

The boom 26 of the vessel 25 is associated with an angular sensor 26' connected to a comparison means 28. The angular display 24 of a conventional type such as is manufactured by BROOKS & GATEHOUSE also comprises an angular sensor 24' of a conventional type which is connected to the comparison means 28.

The comparison means 28 determines the difference between the angle of the boom and the optimum angle displayed on the display 24 and this difference is displayed on a final digital display 29 and on a final angular display 30.

With such a device a pilot has only to follow the indications of devices 29 and 30 in order to bring the sail into its optimum angular position.

With such an arrangement it is possible to very simply go to automatic piloting. In such a case, the boom is controlled by an electromechanical means such as a motor 25' which receives signals from the comparison means 28 so as to maintain the boom in an angular position corresponding to that determined by the computer means 23.

The invention has been described with respect to particular embodiments and apparatus. It is to be understood, however, that the invention is not limited to these embodiments, and that appropriate substitutions and changes may be made without departing from the invention whose scope is limited only by the claims.

What is claimed is:

1. An indicator for indicating the optimum angular position of a given sail for use on a vessel, said sail being adapted to be rotated in various positions relative to a wind, whereby the wind characteristics of said sail relative to the direction of said wind may be represented by a polar curve comprising a laminar zone, a disengagement zone, a transition zone, and a checking zone, said indicator comprising:
   (a) display means for displaying the optimum angular position of said sail relative to said wind;
   (b) evalution means for determining the position of said sail which corresponds to a value on said polar curve between the end of said laminar zone and the beginning of said checking zone as a function of the direction of said wind;
   (c) indication means for indicating the direction of said wind to said evaluation means; and
   (d) driving means for driving said display means to display said optimum position whereby said driving means is adapted to drive said display means so as to display twice the value indicated by said evaluation means.

2. The indicator as defined by claim 1 wherein said indication means for indicating the direction of said wind comprises a vane.

3. The indicator as defined by claim 2 wherein said evaluation means comprises: a cam whose shape is a function of said polar curve; a cam follower adapted to move along said cam; and a first rod adapted to move said follower along said cam.

4. The indicator as defined by claim 3 wherein said evaluation means further comprises second and third rods pivotably connected to one another between said cam follower and said driving means, said second rod adapted to drive said driving means to in turn drive said display means to display the optimum position of said sail.

5. The indicator as defined by claim 4 wherein said first rod is connected to a sleeve, said sleeve being arranged such that the central axis of rotation of said sleeve is at a point at the center of rotation with respect to the movement of said cam follower and arranged above said driving means and coaxial therewith, and wherein said driving means comprises a ring, whereby movement of said vane is communicated to said sleeve thus causing said cam follower to move along said cam which in turn causes said ring to rotate as a function of the shape of said cam.

6. The indicator as defined by claim 1 wherein said driving means further comprises a first pinion, and said display means is mounted on a second pinion, coupled to said first pinion, and having a diameter twice that of said first pinion.

7. The indicator as defined by claim 1 wherein said indication means for indicating the direction of said wind comprises a vane and said indicator further comprises:
(i) a computer means, said computer means being coupled to said vane by means of a transducer; and
(ii) means for providing said computer with information as to the equation defining the optimum angular sail position with respect to varying wind angles as a function of said polar curve for said sail;
said display means being adapted to receive said optimum angular sail position from said computer and to visibly display said position.

8. The indicator as defined by claim 7 wherein said display means displays said optimum angular position digitally.

9. The indicator as defined by claim 8 wherein said indicator is in combination with a vessel comprising a sail and a boom, said indicator further comprising a first angular sensor connected to said boom to sense the angular position of the boom and a second angular sensor connected to said display means, each of said first and second angular sensors being connected to a comparison means for comparing the angles coming from each of said sensors and being in turn connected to a final display means such that the angular difference between the position of the boom and the optimum angular position of said sail is digitally displayed.

10. The indicator as defined by claim 9 wherein the angular position of said boom is controlled by an electromechanical means connected to said comparison means.

11. The indicator as defined by claim 7 wherein said display displays said optimum angular position angularly.

12. The indicator as defined by claim 11 wherein said indicator is in combination with a vessel comprising a sail and a boom, said indicator further comprising: a first angular sensor connected to said boom to sense the angular position of the boom and a second display means for digitally displaying the angular position of said boom; a comparison means connected between said digital display and said second display means; and a final display means for displaying the angular difference between the position of the boom and the optimum angular position of said sail.

13. The indicator as defined by claim 12 wherein the angular position of said boom is controlled by an electromechanical means connected to said comparison means.

14. The indicator as defined by claim 1 in combination with a vessel, a boom, and a sail; and further comprising electromechanical means connected to said indicator for orienting said boom in said optimum angular position.

* * * * *

UNITED STATES PATENT AND TRADEMARK OFFICE
CERTIFICATE OF CORRECTION

PATENT NO. : 4,236,409
DATED : December 2, 1980
INVENTOR(S) : Roland BRACHET

It is certified that error appears in the above—identified patent and that said Letters Patent is hereby corrected as shown below:

Column 1, line 59, "or" should read ---for---.

Column 5, line 59, "A" should read ---(A)---.

Column 6, line 54, "between between" should read ---between---.

Column 6, lines 66 through 68, "the cam which may be appropriately positioned on a vessel follower moves along the cam." should read ---the cam follower moves along the cam which may be appropriately positioned on a vessel.---.

Column 7, line 49, "angl" should read ---angle---.

Signed and Sealed this

Tenth Day of March 1981

[SEAL]

Attest:

RENE D. TEGTMEYER

Attesting Officer     Acting Commissioner of Patents and Trademarks